United States Patent [19]

Goupil et al.

[11] Patent Number: 4,597,843

[45] Date of Patent: Jul. 1, 1986

[54] ENHANCED BULK POROSITY OF POLYMER STRUCTURES VIA PLASMA TECHNOLOGY

[75] Inventors: Dennis W. Goupil, New Milford, Conn.; Mary T. Musolino, Bronx, N.Y.

[73] Assignee: American Cyanamid Company, Stamford, Conn.

[21] Appl. No.: 660,340

[22] Filed: Oct. 12, 1984

[51] Int. Cl.⁴ .................. C07C 3/24; B01D 39/02
[52] U.S. Cl. ............................. 204/165; 204/168; 204/169; 264/22; 210/500.43; 210/500.41; 210/500.38; 210/500.28
[58] Field of Search ............... 204/165, 168, 169; 264/22; 210/500.2

[56] References Cited

U.S. PATENT DOCUMENTS 4,046,843  9/1977  Sano ........................ 264/22
4,283,359  8/1981  Tsutsui ..................... 264/22

Primary Examiner—John F. Niebling
Attorney, Agent, or Firm—Frank M. Van Riet

[57] ABSTRACT

A porous article is prepared by subjecting a substantially non-porous polymeric shaped article containing from about 1.0–30% of plasticizer to a plasma treatment under conditions such that the plasticizer is volatilized or decomposed into gaseous decomposition products thereby creating an internal pore structure while leaving the surface of the article essentially intact and free from microscopically visible pores.

11 Claims, 4 Drawing Figures

ENHANCED BULK POROSITY OF POLYMER STRUCTURES VIA PLASMA TECHNOLOGY

BACKGROUND OF THE INVENTION

The use of plasma technology to modify the surface of polymeric structures such as hollow fibers in order to produce semipermeable membranes has been known in the art, see, for example, U.S. Pat. Nos. 4,046,843 and 4,147,745 hereby incorporated herein by reference. The surface modification of these structures, however, does not enhance the bulk porosity of the resultant membrane and therefore the membrane cannot be utilized for many specific service applications for which it would otherwise prove useful.

THE DRAWING

SUMMARY

Figure 1:
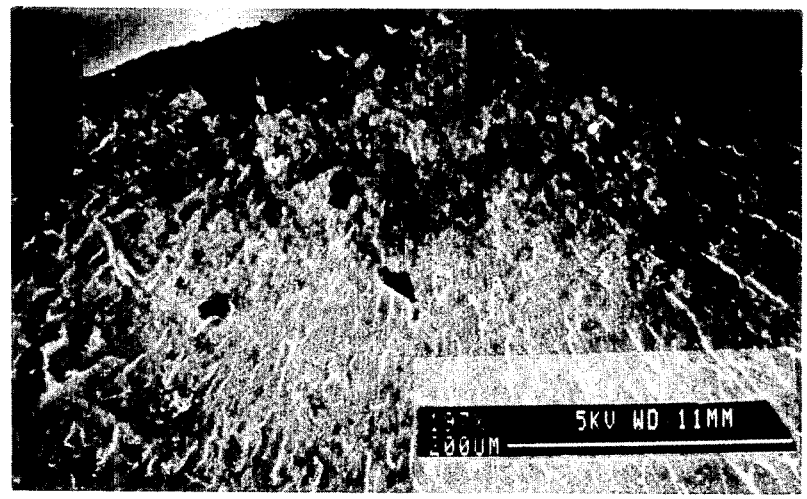
FIG. 1 is a scanning electron microphotograph of the non-porous article of Example 9 before plasma treatment.

A method has been found for the plasma treatment of polymeric structures whereby the structure is formed into a porous shaped article of enhanced bulk porosity while its exterior surfaces are devoid of microscopically visible pores.

DESCRIPTION OF THE INVENTION INCLUDING PREFERRED EMBODIMENTS

The present invention relates to a method for the preparation of a porous, shaped article which comprises subjecting a substantially non-porous polymeric shaped article containing from about 1.0 to about 30.0%, by weight, based on the total weight of the polymer, of a plasticizer to a plasma treatment under conditions such that the plasticizer is volatilized or decomposed into decomposition products thereby creating an internal pore structure while leaving the surface of the article intact and substantially free from microscopically visible pores.

The invention also relates to a preferred embodiment whereby the shaped article is first subjected to an oven treatment before it is subjected to plasma conditions.

The invention further relates to the porous articles produced by the process disclosed herein, said articles being useful for the separation or concentration of substances by reverse osmosis or ultrafiltration.

The shaped articles useful in the present invention may be in various forms such as sheets, films, tubes, e.g. hollow fibers, filaments and the like. The shaped articles may be produced from polymers such as polyvinyl alcohol, polyolefins, polysulfones, polyamides, polycarbonates, polyesters, polyphenyleneoxides, homopolymers and copolymers of acrylonitrile, methylmethacrylate, vinyl chloride, styrene, acetal, and the like, cellulose acetate, cellulose nitrate, etc. The preferred polymers are the polysulfones, the acrylonitrile copolymers and poly(vinylpyrrolidone).

The polymers must contain from about 1.0 to about 30.0%, by weight, based on the total weight of polymer, of a plasticizer which, under the conditions of plasma treatment, will be removed from the polymer such as by volatilization, decomposition, etc., thereby creating an internal pore structure while leaving the exterior surface essentially intact and free of microscopically visible pores. Suitable plasticizers useful in the present process included those having a boiling point of over about 140° C. For example, 2-pyrrolidone, ethylene carbonate, propylene carbonate, propiolactone, v-butyrolactone, δ-valerolactone, y-valerolactone, dimethylformamide, dimethylacetamide, N-acetyl morpholine, methyl ethyl sulfone, tetramethylene sulfone, dimethylsulfoxide, dimethylsulfone, acetonitrile, and the like may be used.

Gases which may be used for the plasma treatment of the polymeric shaped articles which helium, argon, nitrogen, hydrogen, oxygen, carbon monoxide, carbon dioxide, ammonia, hydrocarbons containing 1-10 carbon atoms, e.g. methane, ethane, propane, ethylene, etc., epoxides containing 2-10 carbon atoms, e.g. ethylene oxide, propylene oxide, etc., alkylamines, e.g. dimethylamine, etc. and mixtures thereof. Mixtures of argon and oxygen have been found to be particularly useful. The plasma treatment may be conducted for durations of from about 10-500 seconds, preferably from about 30-350 seconds, at exposure doses ranging from about 25-500 watts, preferably from about 50-400 watts.

A preferred embodiment is to subject the polymeric shaped article to a heat treatment before it is subjected to plasma treatment. The heat treatment appears to prepare the polymer for subjection to the plasma thereby enabling a more uniform formation of porosity within the interior of the polymer. Heat treatment at from about 50° C. to 250° C., preperably from about 100° C. to 200° C., for from about 0.5 to 50 hours, preferably from about 2 to 36 hours, has been found to be sufficient.

The precise chemical mechanism by which the articles of the present invention are formed is not completely understood. However, what is achieved is the increase in the bulk porosity of the shaped article without the formation of microscopically visible pores in the exterior surface of the article.

The plasma referred to herein means a plasma formed by glow discharge, corona discharge or the like.

The porous articles hereof may be widely used for separation and concentration of substances by reverse osmosis, ultra-filtration, etc., i.e. for disalination of sea water, treatment of waste water, concentration of fruit juices, separation of gases, e.g., $CH_4/CO_2$ or $H_2/N_2$; barrier films, catalyst supports and the like.

The following examples are set forth for purposes of illustration only and are not to be construed as limitations on the present invention except as set forth in the appended claims. All parts and percentages are by weight unless otherwise specified.

In the following examples, there is used an inductively coupled r.f. plasma (13.6 MHz) using a Branson IPC Model 2000 plasma reactor. The unit is equipped with a quartz reaction chamber and a gas mixing module capable of handling three gases simultaneously. The major techniques used to characterize plasma treated articles are contact angle goniometry to obtain surface wettability; Fourier transform Infrared Spectroscopy used primarily in the attenuated total reflectance (ATR) mode (FTIR/ATR); and scanning electron microscopy (SEM) for morphology. Permeability values are expressed in gas permeation units $$1 GPU = 1 \times 10^{-6} \frac{cc(STP)}{cm^2 SEC\ cmHg}$$

EXAMPLE 1

A terpolymer of 91.2% of acrylonitile, 6.4% of methyl methacrylate and 2.4% of methacrylic acid and containing 1% water and 10% propylene carbonate in the form of a nonporous, hollow fiber 1 mm in diameter is heated for 24 hours at 120° C. in a forced air oven and then subjected to plasma (Ar/$O_2$-80/20) at 0.2–0.6 Torr and at 100 Watts for 90 seconds. The resultant fiber has a diameter of 4.5 mm, a uniformly porous interior and is unblistered with an inside wall thickness of 20 cm.

The resultant fiber is tested, using gas permeability mesurements. The results (GPU) are He:285.0; $N_2$:246.7; $CO_2$:69.5.

EXAMPLES 2-8

Following the procedure of Example 1, the fiber thereof is subjected to variations in oven conditions and plasma treatment conditions as set forth in Table I, below. In the table, C=comparative.

TABLE I

| Example | Oven Conditions | Plasma Conditions | Inside Wall Thickness (mm) | Final Diameter (mm) | Comments |
|---------|-----------------|-------------------|----------------------------|---------------------|----------|
| 2C | 150° C.; 24 hrs. | 300 W; 90 sec. | 61 | 2.4 | Porous, burnt. Oven treatment too high |
| 3C | 150° C.; 6 hrs. | 100 W; 45 sec. | 100 | 1.6 | Very little porosity - Insufficient plasma treatment. |
| 4 | 150° C.; 6 hrs. | 300 W; 90 sec. | 24 | 4 | Porous, uniform, unblistered |
| 5C | 150° C.; 24 hrs. | 100 W; 45 sec. | 278 | 1.53 | No porosity, Insufficient plasma treatment |
| 6C | 120° C.; 6 hrs. | 100 W; 90 sec. | 55 | 2.5 | Blistered |
| 7C | 120° C.; 6 hrs. | 300 W; 45 sec. | 94 | 2.16 | Blistered |
| 8C | 120° C.; 24 hrs. | 300 W; 45 sec. | 15.7 | 6.3 | Very expanded |

EXAMPLE 9

Figure 2:
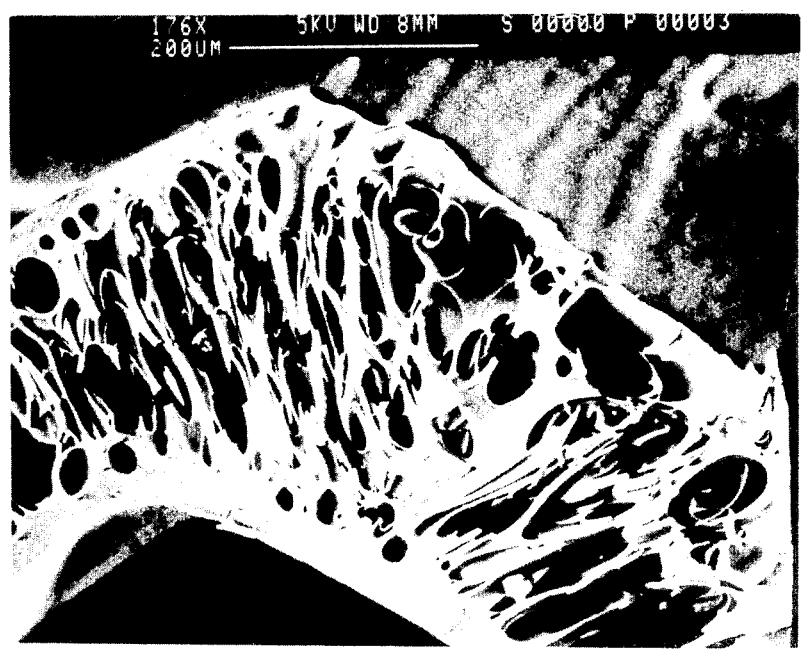
FIG. 2 is a scanning electron microphotograph of the porous article of Example 9 after plasma treatment.

Again following the procedure of Example 1 except that the plasma treatment is 300 watts for 30 seconds, a porous structured article with substantially no surface modification results. Scanning electron microphotographs of cross-sections of the fibers are shown in FIGS. 1 and 2 of the drawings representing the article before and after plasma treatment.

EXAMPLES 10-12

Again following the procedure of Example 1, various porous structures are produced and tested. The results are set forth in Table 2, below. Again, C=comparative.

TABLE 2

| Example | Oven Treatment | Plasma Treatment | Permeability Results (GPU) |
|---------|----------------|------------------|-----------------------------|
| 10C | 150° C.; 6 hrs. | 300 W; 90 sec. | He:0; $N_2$:0; $CO_2$:0 |
| 11 | 150° C.; 6 hrs. | 300 W; 100 sec. | He:219.1; $N_2$:100.1; $CO_2$:164.3 |
| 12C | 120° C.; 24 hrs. | 80 W; 2.5 min. | He:0; $N_2$:0; $CO_2$:0 |

EXAMPLES 13-15

Again following the procedure of Example 1 except that the terpolymer is 91.3% acrylonitrile; 6.4% methyl methacrylate and 2.3% methacrylic acid and contains 12% water and 17% propylene carbonate, the following results set forth in Table 3 are observed. C=comparative. The fiber size is 1.3 mm, o.d.

TABLE 3

| Example | Oven Treatment | Plasma Treatment | Permeability Results (GPU) |
|---------|----------------|------------------|-----------------------------|
| 13 | 120° C.; 24 hrs. | 125 W; 35 sec. | He:190.0; $N_2$:120.5; $CO_2$:100.8 |
| 14C | 120° C.; 24 hrs. | 100 W; 35 sec. | He:0; $N_2$:0; $CO_2$:0 |
| 15C | 120° C.; 24 hrs. | 100 W; 40 sec. | He:0; $N_2$:0; $CO_2$:0 |

EXAMPLE 16

Figure 3:
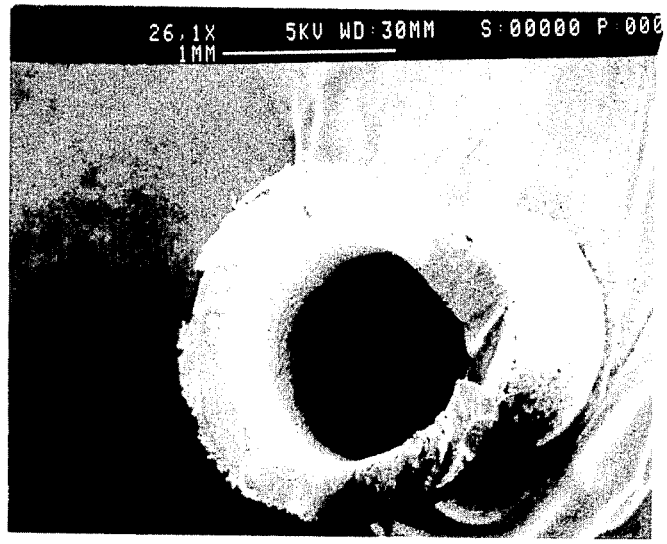
FIG. 3 is a scanning electron microphotograph of the non-porous polysulfone article of Example 16 before plasma treatment.
Figure 4:
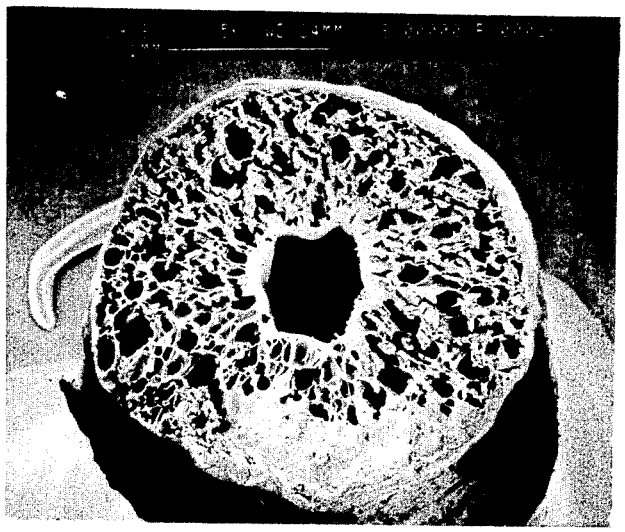
FIG. 4 is a scanning electron microphotograph of the porous polysulfone article of Example 16 after plasma treatment.

Following the procedure of Example 1, polysulfone containing 20% of dimethylformamide is substituted for the terpolymer thereof. The fiber has an outside diameter of 1.3 mm. The plasma treatment is 200 W for 50 seconds. No oven treatment is conducted. Scanning electron microphotographs of cross-sections of the fibers are shown as FIGS. 3 and 4 of the drawings as before and after treatment, respectively.

EXAMPLE 17

Similar results as set forth in Table 1 are achieved when the procedure of Example 1 is followed using a blend of 70% polysulfone, 6% poly(vinyl pyrrolidone), 22% dimethyl formamide and 2% water.

We claim:

1. A method for the preparation of a porous, polymer, shaped article which comprises subjecting a substantially non-porous polymer shaped article containing from about 1.0 to 30%, by weight, based on the total weight of the polymer, of a plasticizer, to a plasma treatment for about 10 to 500 seconds and at an exposure dose ranging from about 25 to 500 watts such that the plasticizer is volatized or decomposed into gaseous decomposition products thereby creating an internal pore structure while leaving the surface of the article essentially intact and free from microscopically visible pores.

2. A method according to claim 1 where the porous, shaped article is in the form of a hollow fiber or flat film.

3. A method according to claim 1 wherein said polymer is an acrylonitrile polymer, a polysulfone, a polyamide, a polyester, a polyalkyleneoxide, a poly(vinyl pyrrolidone), a polycarbonate, a polyolefin, or a poly(vinyl alcohol).

4. A method according to claim 1 wherein said polymer is acrylonitrile polymer.

5. A method according to claim 1 wherein the gas used to form the plasma is at least one of helium, argon, nitrogen, hydrogen, oxygen, carbon monoxide, carbon dioxide, hydrocarbons having 1–10 carbon atoms, alkylamines or epoxides having 2–10 carbon atoms.

6. A method according to claim 1 wherein the plasma is formed by glow discharge or corona discharge.

7. A method according to claim 1 wherein said shaped article is in the form of a tube.

8. A method according to claim 1 wherein the shaped article is subjected to an oven treatment at 50°–250° C. for from 0.5–50 hours before being subjected to said plasma treatment.

9. A method according to claim 1 wherein the duration of plasma treatment is 30–350 seconds and the exposure dose is 50–400 watts.

10. An article for the separation of mixtures of substances which is produced by the method of claim 1.

11. An article according to claim 10 which is used for separation or concentration of substances by reverse osmosis or ultrafiltration.

* * * * *